US008087993B2

(12) United States Patent
Nguyen

(10) Patent No.: US 8,087,993 B2
(45) Date of Patent: Jan. 3, 2012

(54) METHOD OF GAMING, A GAMING SYSTEM AND A GAME CONTROLLER

(75) Inventor: Hung Ngoc Nguyen, Sefton (AU)

(73) Assignee: Aristocrat Technologies Australia Pty Limited (AU)

( * ) Notice: Subject to any disclaimer, the term of this patent is extended or adjusted under 35 U.S.C. 154(b) by 486 days.

(21) Appl. No.: 12/340,713

(22) Filed: Dec. 20, 2008

(65) Prior Publication Data

US 2009/0239634 A1 Sep. 24, 2009

(30) Foreign Application Priority Data

Dec. 21, 2007 (AU) ................................ 2007907051

(51) Int. Cl.
*A63F 13/10* (2006.01)

(52) U.S. Cl. ........................................................ 463/21

(58) Field of Classification Search ............... 463/16–21
See application file for complete search history.

(56) References Cited

U.S. PATENT DOCUMENTS

| | | | | |
|---|---|---|---|---|
| 5,207,693 | A | 5/1993 | Phillips | |
| 6,132,312 | A | 10/2000 | Hecht | |
| 6,159,095 | A * | 12/2000 | Frohm et al. | 463/19 |
| 6,533,273 | B2 * | 3/2003 | Cole et al. | 273/138.1 |
| 7,033,272 | B1 | 4/2006 | Mason | |
| 2002/0125635 | A1 | 9/2002 | Lemberg | |
| 2003/0211882 | A1 | 11/2003 | Smith, Jr. et al. | |
| 2005/0130737 | A1 | 6/2005 | Englman et al. | |
| 2006/0089192 | A1 | 4/2006 | Okada | |
| 2006/0194629 | A1 | 8/2006 | Strom | |
| 2006/0264254 | A1 | 11/2006 | Aoki | |

FOREIGN PATENT DOCUMENTS

| | | |
|---|---|---|
| CA | 1169406 | 6/1984 |
| CA | 2191744 | 12/1995 |
| DE | 3601824 | 7/1987 |
| EP | 1363253 | 11/2003 |
| EP | 1501056 | 1/2005 |
| EP | 1544811 | 6/2005 |
| GB | 190421971 | 9/1905 |
| GB | 190706422 | 10/1907 |
| GB | 191220058 | 4/1913 |
| GB | 341017 | 1/1931 |
| GB | 387032 | 2/1933 |
| GB | 560260 | 3/1944 |
| GB | 648389 | 1/1951 |
| GB | 734909 | 8/1955 |
| GB | 958894 | 5/1964 |
| GB | 1163424 | 9/1969 |
| GB | 1267863 | 3/1972 |
| GB | 1342621 | 1/1974 |
| GB | 2384097 | 7/2003 |

(Continued)

*Primary Examiner* — N Drew Richards
*Assistant Examiner* — Daniel Shook
(74) *Attorney, Agent, or Firm* — McAndrews, Held & Malloy, Ltd.

(57) ABSTRACT

A method of gaming comprising: selecting in at least one game round a plurality of symbols for display to a player in a set of display positions; modifying the displayed symbols copying each symbol in an original subset of the display positions to at least one clone subset of the display positions which is identical to or laterally displaced from the original subset, in response to determining that a subset of the symbols should be cloned; and determining an outcome based on the modified symbols.

29 Claims, 11 Drawing Sheets

FOREIGN PATENT DOCUMENTS

| | | |
|---|---|---|
| GB | 2429657 | 3/2007 |
| JP | 2000172490 | 6/2000 |
| JP | 2001238996 | 9/2001 |
| JP | 2002177449 | 6/2002 |
| JP | 2003210653 | 7/2003 |
| JP | 2003236054 | 8/2003 |
| JP | 2003236055 | 8/2003 |
| JP | 2004129831 | 4/2004 |
| JP | 2005125127 | 5/2005 |
| JP | 2006255053 | 9/2006 |
| WO | 2006023327 | 3/2006 |
| WO | 2007030786 | 3/2007 |

* cited by examiner

Fig 7A

| 740a - Reel 1 | 740b - Reel 2 | 740c - Reel 3 | 740d - Reel 4 | 740e - Reel 5 | |
|---|---|---|---|---|---|
| Q | K | J | 10 | 9 | 750a - top line |
| K | WILD | 10 | K | A | 750b - center line |
| A | 9 | SCATTER | J | Q | 750c - bottom line |

Fig 7B

| | | | | |
|---|---|---|---|---|
| K | K | J | 10 | 9 |
| WILD | WILD | 10 | K | A |
| 9 | 9 | SCATTER | J | Q |

Fig 8A

| | | | | |
|---|---|---|---|---|
| Q | K | J | 10 | 9 |
| K | WILD | 10 | K | A |
| A | 9 | SCATTER | J | Q |

Fig 8B

| | | | | |
|---|---|---|---|---|
| K | K | K | 10 | 9 |
| WILD | WILD | WILD | K | A |
| 9 | 9 | 9 | J | Q |

Fig 8C

| | | | | |
|---|---|---|---|---|
| 9 | 9 | 9 | J | K |
| 8 | 8 | 8 | A | Q |
| 7 | 7 | 7 | 9 | 7 |

Fig 9A

| | | | | |
|---|---|---|---|---|
| Q | K | J | 10 | 9 |
| K | WILD | 10 | K | A |
| A | 9 | SCATTER | J | Q |

Fig 9B

| | | | | |
|---|---|---|---|---|
| J | J | J | J | 9 |
| 10 | 10 | 10 | 10 | A |
| SCATTER | SCATTER | SCATTER | SCATTER | Q |

Fig 9C

| | | | | |
|---|---|---|---|---|
| A | 9 | A | K | J |
| Q | 10 | 9 | J | 9 |
| 10 | K | WILD | Q | K |

Fig 9D

| | | | | |
|---|---|---|---|---|
| A | A | A | A | J |
| 9 | 9 | 9 | 9 | 9 |
| WILD | WILD | WILD | WILD | K |

Fig 9E

| | | | | |
|---|---|---|---|---|
| WILD | SCATTER | Q | K | 9 |
| 9 | A | J | 10 | J |
| Q | K | SCATTER | A | 10 |

Fig 9F

| | | | | |
|---|---|---|---|---|
| Q | Q | Q | Q | 9 |
| J | J | J | J | J |
| SCATTER | SCATTER | SCATTER | SCATTER | 10 |

Fig 10A

| | | | | |
|---|---|---|---|---|
| WILD | A | Q | K | 9 |
| 9 | SCATTER | J | 10 | J |
| Q | K | SCATTER | A | 10 |

Fig 10B

| | | | | |
|---|---|---|---|---|
| WILD | A | Q | K | 9 |
| 9 | SCATTER | J | 10 | J |
| Q | K | SCATTER | A | 10 |

Fig 10C

| | | | | |
|---|---|---|---|---|
| WILD | A | Q | K | 9 |
| 9 | SCATTER | J | 10 | J |
| Q | K | SCATTER | A | 10 |

Fig 10D

| | | | | |
|---|---|---|---|---|
| WILD | A | WILD | A | 9 |
| 9 | SCATTER | 9 | SCATTER | J |
| Q | K | SCATTER | A | 10 |

Fig 11A

| | | | | |
|---|---|---|---|---|
| K | A | K | K | 9 |
| J | SCATTER | 9 | J | J |
| Q | K | SCATTER | A | 10 |

Fig 11B

| | | | | |
|---|---|---|---|---|
| K K | A | K | K | 9 |
| J J | SCATTER | 9 | J | J |
| Q Q | K | SCATTER | A | 10 |

Fig 11C

| | | | | |
|---|---|---|---|---|
| A A | A | K | A | 9 |
| 9 9 | K | Q | J | 8 |
| 7 7 | Q | WILD | 7 | 7 |

METHOD OF GAMING, A GAMING SYSTEM AND A GAME CONTROLLER

RELATED APPLICATIONS

This application claims priority to Australian Provisional Patent Application No. 2007907051, having a filing date of Dec. 21, 2007, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to a method of gaming, a gaming system and a game controller.

BACKGROUND OF THE INVENTION

Gaming systems are known comprising a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine with selected symbols are displayed in virtual reels on a video display.

While such systems provide users with enjoyment, there is a need for alternative gaming systems with different features.

BRIEF SUMMARY OF THE INVENTION

According to a first aspect of the invention there is provided a method of gaming comprising:

selecting in at least one game round a plurality of symbols for display to a player in a set of display positions;

modifying the displayed symbols copying each symbol in an original subset of the display positions to at least one clone subset of the display positions which is identical to or laterally displaced from the original subset, in response to determining that a subset of the symbols should be cloned; and determining an outcome based on the modified symbols.

In an embodiment, subsets of the display positions corresponding to respective ones of a plurality of reels set side by side.

In an embodiment, the clone subset is identical to the original subset, and the symbols of the original subset are duplicated side by side at half-width, fitting in the same display position.

In an embodiment, the clone subset is laterally displaced from the original subset and symbols of the original subset replace symbols previously occupying corresponding display positions of the cloned subsets.

In an embodiment, the original subset is all the visible symbols of one reel. In an embodiment, the original subset is all the symbols at least at the display positions of an original reel and the clone subsets are displaced horizontally from the original subset occupying clone reels, whereby the visible symbols of the original reel are copied to the clone reels.

In an embodiment, the original subset and each clone subset are mutually non-overlapping rectangular regions.

In an embodiment, at least one of the clone subsets is not fully within the display positions of the reel whereby other symbols on at least one reel are changed.

In an embodiment, the step of determining that a subset of the symbols should be cloned is triggered by the appearance of a particular symbol combination in the display positions, by a random event, or by the player purchasing a cloning right.

In an embodiment, the original subset is determined by player choice, by a random event, or by the occurrence of a particular symbol or symbol combination.

In an embodiment, the player choice includes the payment of different wagers depending on the symbol or symbol combination.

In an embodiment, at least one clone subset is determined by player choice, by a random event, or by the occurrence of a particular symbol or symbol combination.

In an embodiment, the player choice includes the payment of different wagers depending on the symbol or symbol combination.

In an embodiment, the method further comprises the step of retaining the cloned symbols during one or more following cloned symbol game rounds.

In an embodiment, the method comprises restricting the symbol selection in the following cloned symbol game rounds so that the reel positions for reels containing the clone subset and the original subset are fixed relative to each other.

In an embodiment, the original subset is all the visible positions of an original reel and the cloned subsets are all the visible positions of clone reels, and non-visible symbols on the original reel are also copied to corresponding non-visible positions on the clone reels, so that the original and clone reels show the same symbols in each visible reel position in the following cloned symbol game rounds.

In accordance with a second aspect of the invention there is provided a gaming system comprising:

a display for symbols to be displayed in a set of display positions to a player;

a symbol selector for selecting in each game round a plurality of symbols for display to the player in a set of display positions;

a cloned symbol controller arranged to modify the displayed symbols by copying each symbol in an original subset of the display positions to at least one clone subset of the display positions which is identical to or laterally displaced from the original subset, in response to determining that a subset of the symbols should be cloned; and an outcome generator arranged to determine an outcome based on the modified symbols.

In an embodiment, subsets of the display positions correspond to respective ones of a plurality of reels set side by side, each subset comprising a plurality of visible reel positions on spinning reels.

In an embodiment, the clone subset is identical to the original subset, and the symbols of the original subset are duplicated side by side at half-width, fitting in the same display position.

In an embodiment, the clone subset is laterally displaced from the original subset and symbols of the original subset replace symbols previously occupying corresponding display positions of the cloned subsets.

In an embodiment, the original subset is all the visible symbols of one reel.

In an embodiment, the original subset is all the symbols at least at the display positions of an original reel and the clone subsets are displaced horizontally from the original subset occupying clone reels, whereby the visible symbols of the original reel are copied to the clone reels.

In an embodiment, the original subset and each clone subset are mutually non-overlapping rectangular regions.

In an embodiment, at least one of the clone subsets is not fully within the display positions of the reel whereby other symbols on at least one reel are changed.

In an embodiment, the game controller is arranged to determine that a subset of the symbols should be cloned in response to at least one of the appearance of a particular symbol combination in the display positions, a random event, or the player purchasing a cloning right.

In an embodiment, the game controller is arranged to determine the original subset based on at least one of a player choice, a random event, or the occurrence of a particular symbol or symbol combination.

In an embodiment, the player choice includes the payment of different wagers depending on the symbol or symbol combination.

In an embodiment, the game controller is arranged to determine the at least one clone subset based on at least one of a player choice, a random event, or the occurrence of a particular symbol or symbol combination.

In an embodiment, the player choice includes the payment of different wagers depending on the symbol or symbol combination.

In an embodiment, the cloned symbol controller is arranged to retain the cloned symbols during one or more following cloned symbol game rounds.

In an embodiment, the game controller is arranged to restrict the symbol selection in the following cloned symbol game rounds so that the reel positions for reels containing the clone subset and the original subset are fixed relative to each other.

In an embodiment, the original subset is all the visible positions of an original reel and the cloned subsets are all the visible positions of clone reels, and non-visible symbols on the original reel are also copied to corresponding non-visible positions on the clone reels, so that the original and clone reels show the same symbols in each visible reel position in the following cloned symbol game rounds.

In an embodiment, the gaming system comprises a game play mechanism operable by the player for game play.

In an embodiment, the gaming system comprises a memory storing program code and a processor arranged to execute the program code to implement the game controller.

In accordance with a third aspect of the invention there is provided a game controller for a gaming system, the game controller comprising:

a symbol selector for selecting in each game round a plurality of symbols for display to the player in a set of display positions on a display in data communication with the game controller;

a cloned symbol round controller arranged to modify the displayed symbols by copying each symbol in an original subset of the display positions to at least one clone subset of the display positions which is identical to or laterally displaced from the original subset, in response to determining that a subset of the symbols should be cloned; and an outcome generator arranged to determine an outcome based on the modified symbols.

In an embodiment, subsets of the display positions correspond to respective ones of a plurality of reels set side by side, each subset comprising a plurality of visible reel positions on spinning reels.

In an embodiment, the clone subset is identical to the original subset, and the symbols of the original subset are duplicated side by side at half-width, fitting in the same display position.

In an embodiment, the clone subset is laterally displaced from the original subset and symbols of the original subset replace symbols previously occupying corresponding display positions of the cloned subsets.

In an embodiment, the original subset is all the visible symbols of one reel.

In an embodiment, the original subset is all the symbols at least at the display positions of an original reel and the clone subsets are displaced horizontally from the original subset occupying clone reels, whereby the visible symbols of the original reel are copied to the clone reels.

In an embodiment, the original subset and each clone subset are mutually non-overlapping rectangular regions.

In an embodiment, at least one of the clone subsets is not fully within the display positions of the reel whereby other symbols on at least one reel are changed.

In an embodiment, the game controller as is arranged to determine that a subset of the symbols should be cloned in response to at least one of the appearance of a particular symbol combination in the display positions, a random event, or the player purchasing a cloning right.

In an embodiment, the game controller as is arranged to determine the original subset based on at least one of a player choice, a random event, or the occurrence of a particular symbol or symbol combination.

In an embodiment, the player choice includes the payment of different wagers depending on the symbol or symbol combination.

In an embodiment, the game controller as is arranged to determine the at least one clone subset based on at least one of a player choice, a random event, or the occurrence of a particular symbol or symbol combination.

In an embodiment, the player choice includes the payment of different wagers depending on the symbol or symbol combination.

In an embodiment, cloned symbol controller is arranged to retain the cloned symbols during one or more following cloned symbol game rounds.

In an embodiment, the game controller is arranged to restrict the symbol selection in the following cloned symbol game rounds so that the reel positions for reels containing the clone subset and the original subset are fixed relative to each other.

In an embodiment, the original subset is all the visible positions of an original reel and the cloned subsets are all the visible positions of clone reels, and non-visible symbols on the original reel are also copied to corresponding non-visible positions on the clone reels, so that the original and clone reels show the same symbols in each visible reel position in the following cloned symbol game rounds.

In an embodiment, the game controller is implemented by a processor executing program code stored in a memory.

In accordance with a fourth aspect, there is provided Computer program code which when executed by a computer causes the computer to implement the method of gaming of the first aspect.

In accordance with a fifth aspect of the invention there is provided a computer readable medium comprising the program code of the fourth aspect of the invention.

In accordance with a sixth aspect of the invention there is provided a data signal comprising the computer readable program code of the fourth aspect of the invention.

In accordance with a seventh aspect, the invention extends to transmitting the above program code.

BRIEF DESCRIPTION OF SEVERAL VIEWS OF THE DRAWINGS

An embodiment of the invention is described in relation to the following drawings by way of example.

FIGS. 7A to 7B show displays of Example 1;

FIGS. 8A to 8C show displays of Example 2;

FIGS. 9A to 9F show displays of Example 3;

FIGS. 10A to 10D show displays of Example 4;

FIGS. 11A to 11D show displays of Example 5; and

DETAILED DESCRIPTION OF THE INVENTION

Figure 1:
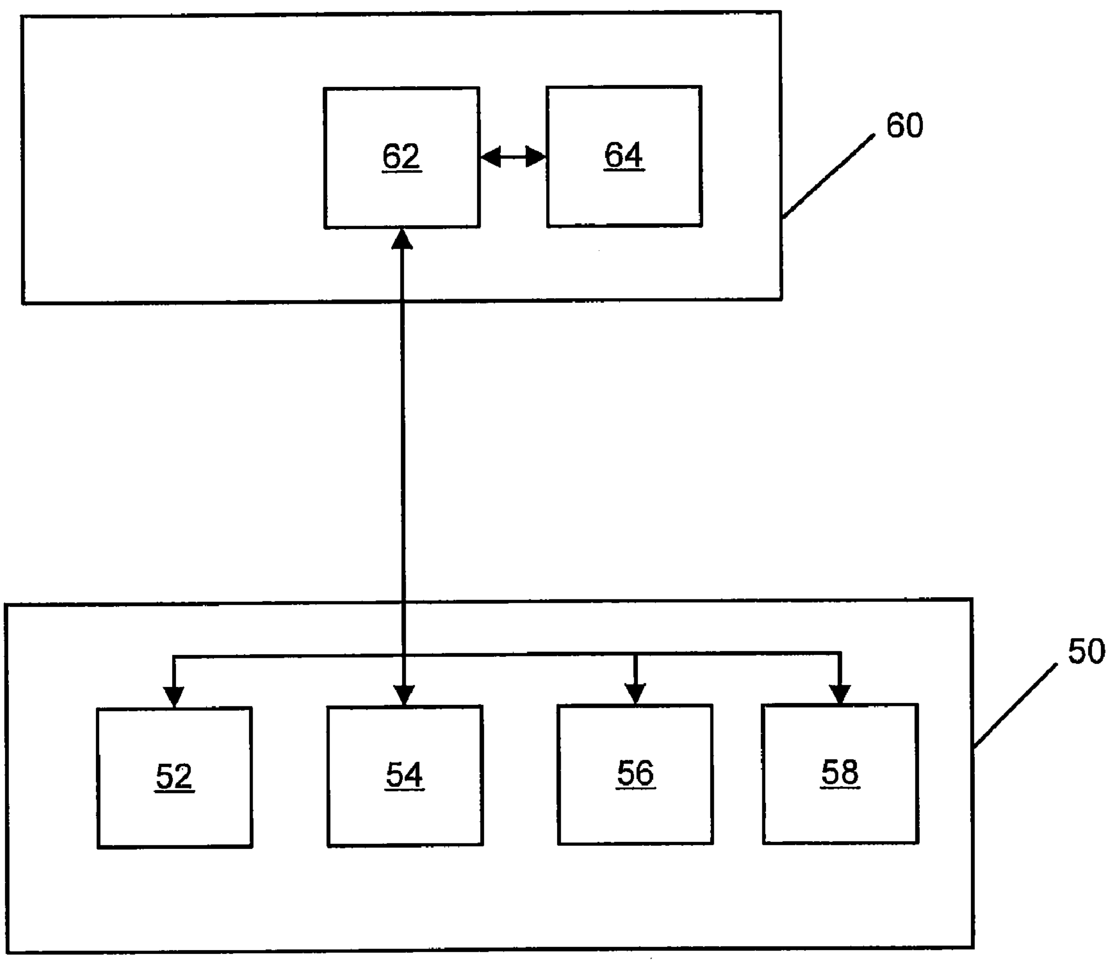
FIG. 1 is a block diagram of the core components of a gaming system.

Referring to the drawings, there is shown a gaming system arranged to implement a game wherein symbols at original subsets of the display positions can be copied to form cloned subsets of symbols. The gaming system can take a number of different forms.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
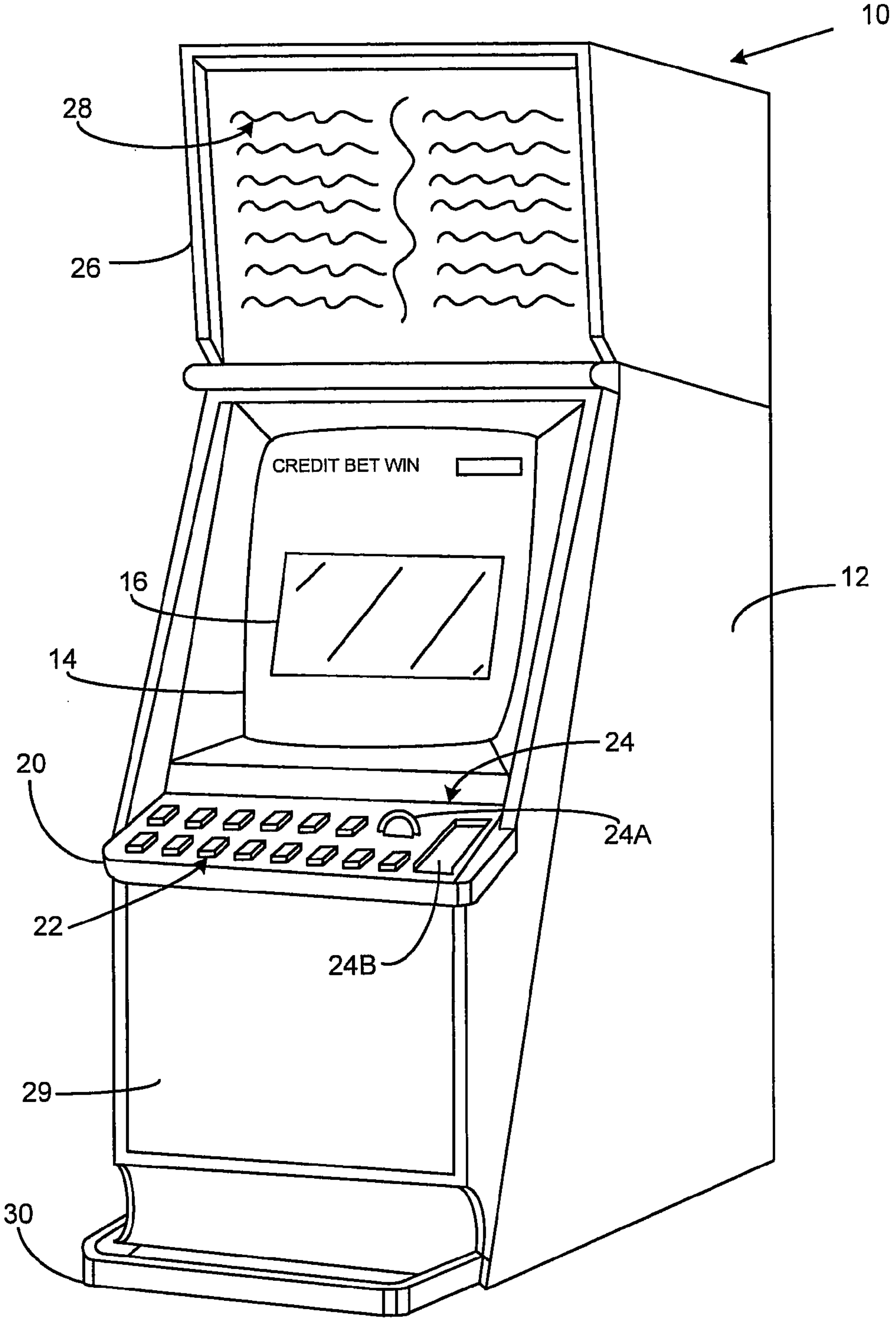
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
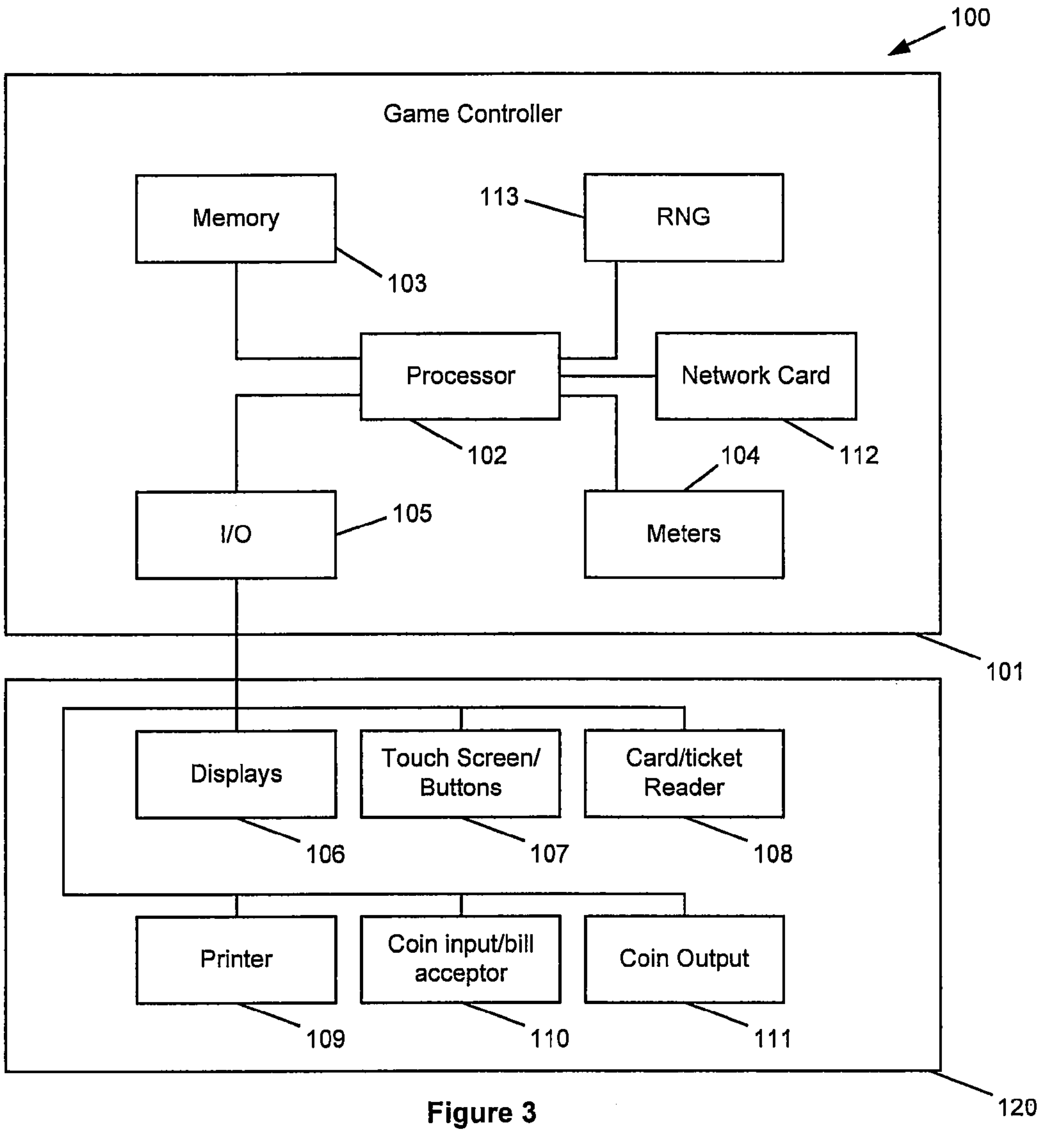
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 and comprises one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
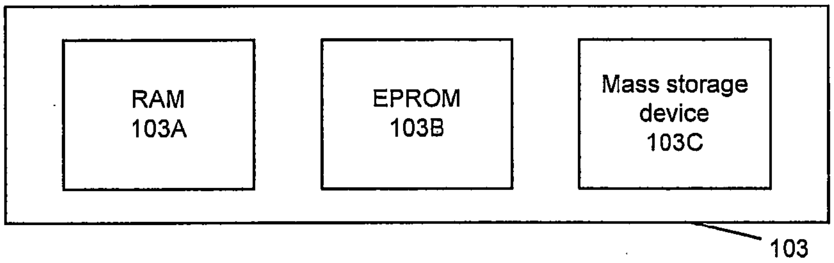
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
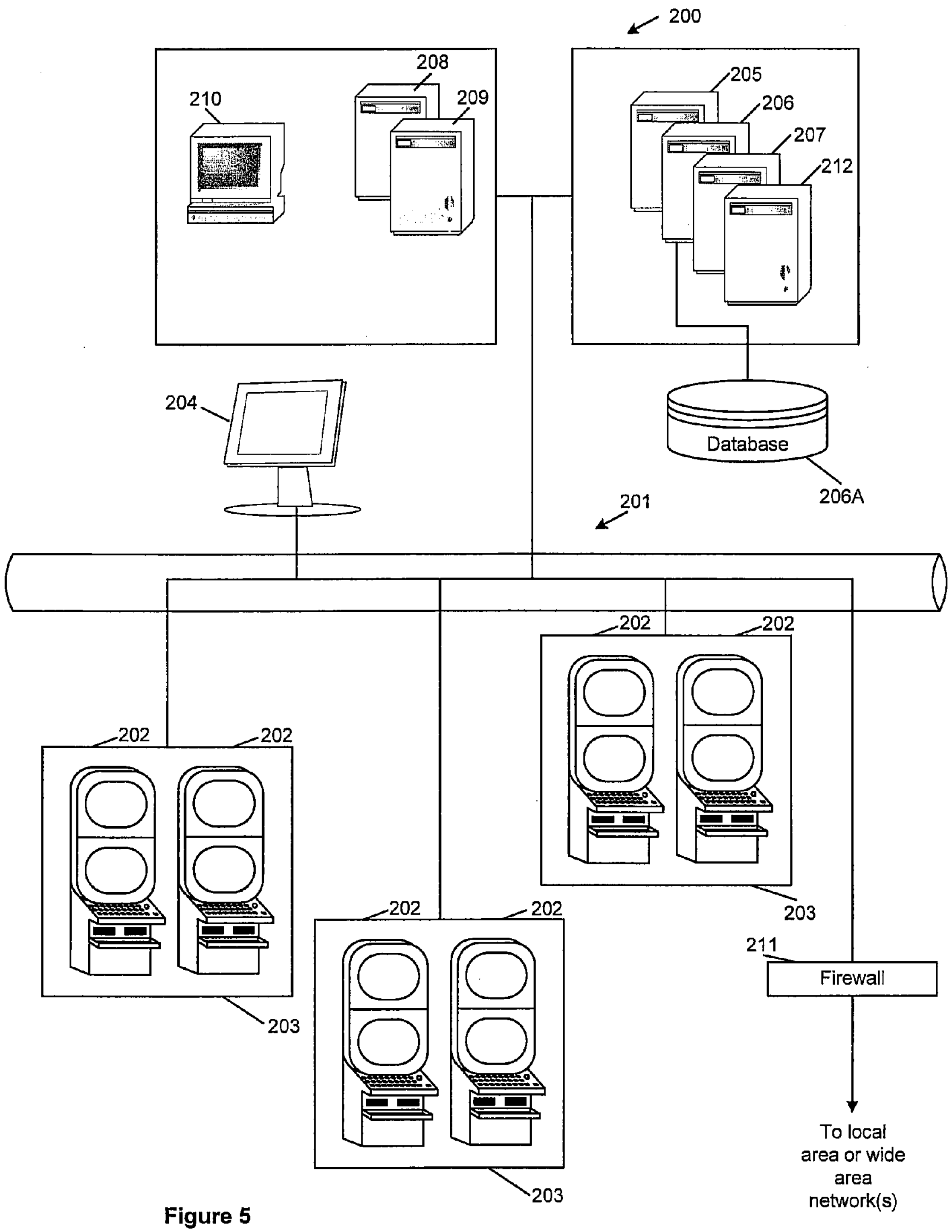
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Embodiments of the invention relate to gaming systems for implementing games that involve a display of spinning reels as part of the display of the outcome of the game. The game controllers of such gaming systems have a stop determining function that determines the stop position for each reel. For example, if there are five reels, each having twenty symbols, the stop determining function might determine that the stop positions are positions: 3, 13, 7, 9 and 17. The spinning of the reels is then controlled so that each symbol comes to a stop in the same row, typically a predetermined row in a "window" corresponding to a "single win line" game. When a reels stops, the symbols will be in one of a plurality of possible symbol positions for that reel relative to the stop position.

Figure 6:
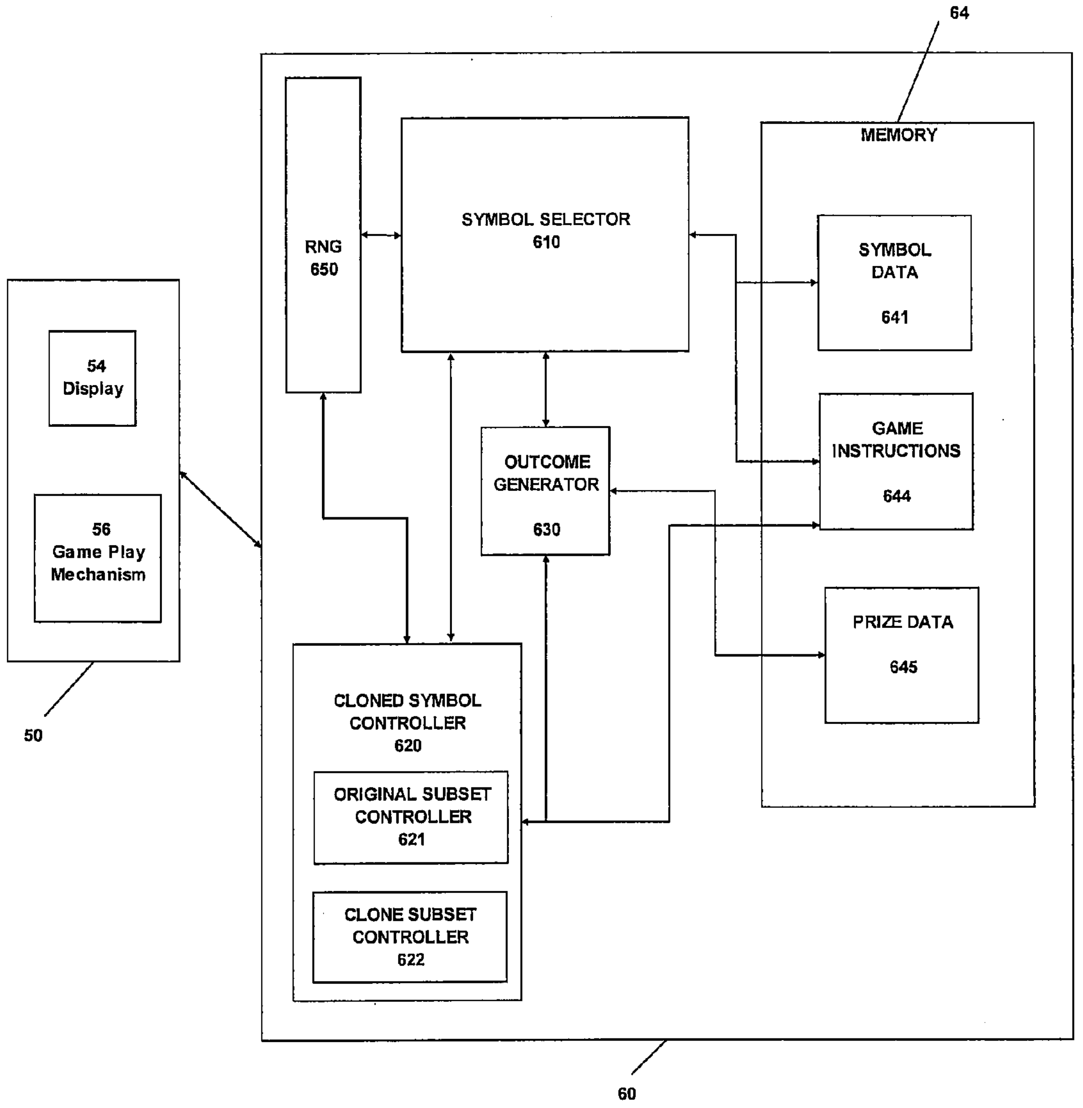
FIG. 6 is a further block diagram of the gaming system.

Exemplary embodiments of the present invention relate to gaming systems that allow a player to select how many win lines of a plurality of win lines they will play in each game—i.e. a minimum of one win line up to the maximum number of win lines allowed by the game. Each win line is formed by a set of symbol positions consisting of one symbol position from each reel. That is, a predetermined symbol position of each reel is assigned to a win line. The symbol positions that constitute each of the win lines are usually advertised to the player by markings on the display or diagrams showing the symbol positions that correspond to each win line. The win lines may be for example, horizontal or diagonal lines. The game controller of one embodiment is shown in more detail in FIG. 6. The game controller 60 incorporates a symbol selector 610 that selects symbols using random numbers from random number generator 650, including possibly a bonus game symbol, to appear on the display 54. When activated by a determination that a subset of the symbols should be cloned, cloned symbol controller 620 operates via original subset controller 621 and clone subset controller 622 to obtain from the player via game play mechanism 56 the original and clone subsets respectively. Clone symbol controller 621 then copies the symbols from the original subset of display positions to the clone subset of display positions to thereby modify the displayed symbols. That is in this embodiment, the player selects both the subset to be cloned and the position at which the subset is to be cloned. In another embodiment, the clone symbol controller 620 selects the subset to be cloned and the positions at which they are cloned.

The outcome generator 630 calculates any prize associated with the current round depending on the game instructions 644 and updates prize data 645 and display 54 on the player interface 50.

Figure 12:
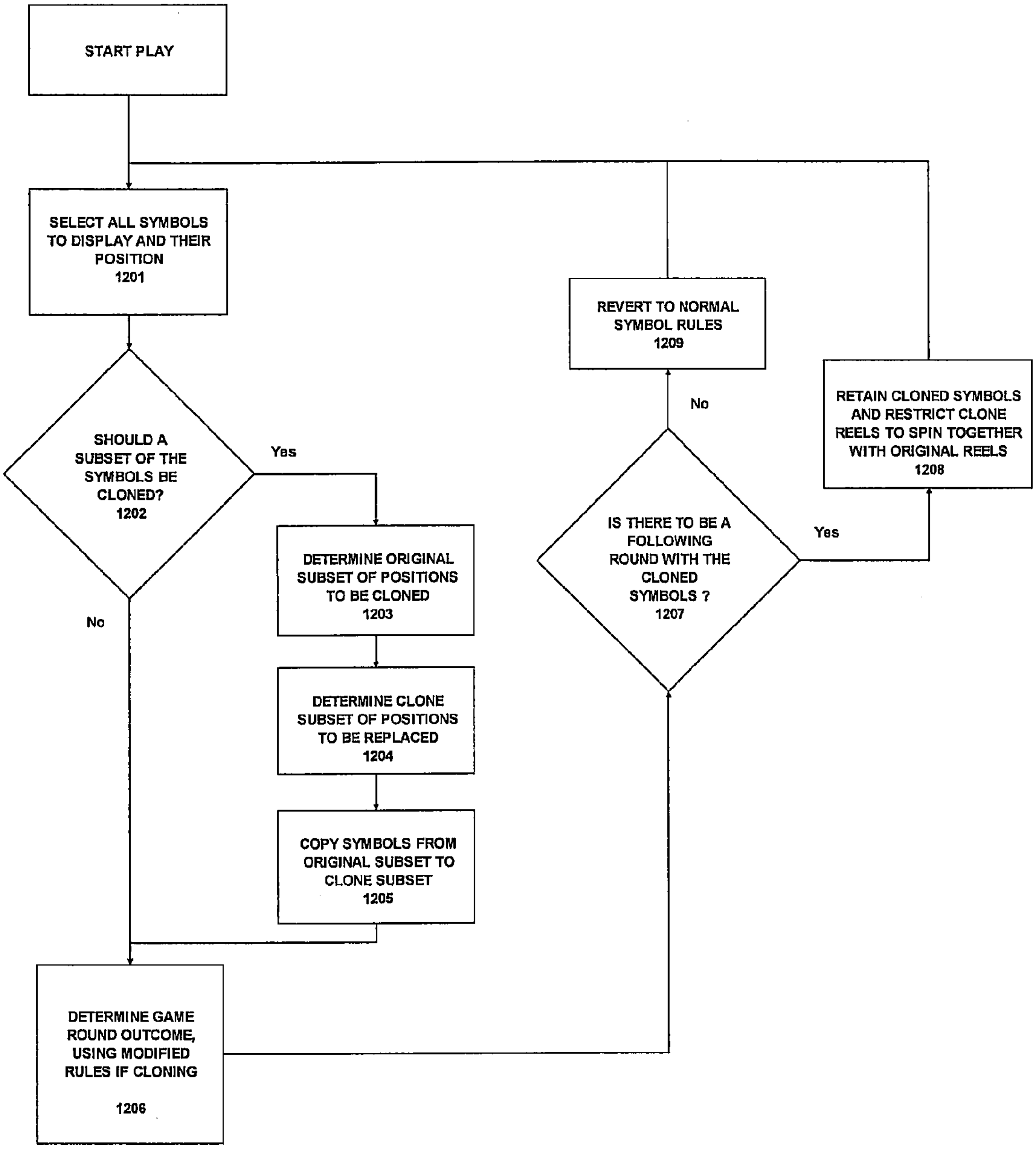
FIG. 12 shows a flow diagram for the method of an embodiment of the invention.

Now referring to FIG. 12, a flow diagram for an embodiment of the invention is shown. The step of symbol selection 1201 is to select the symbols for display. The system then performs the step 1202 of determining whether a subset of symbols should be cloned. If so, the cloned symbol game controller 620 performs 3 steps 1203, 1204 and 1205 of determining the original subset, the clone subset and then of copying the symbols from the original subset to the clone subset or subsets. Then the outcome generator 630 determines in step 1206 the game round outcome based on the modified symbols. After the conclusion of the current game, the cloned symbol controller 620 determines in step 1207 whether there is to be another following game round using the cloned symbols. If so, in step 1208 the cloned symbols are retained, optionally non-visible symbols on the same reels are also cloned, and the next step 1201 of symbol selection is noted as one with restricted selection such that the original and clone reels are spun together. If there is not to be a following game round using the cloned symbols, in step 1209 the cloned symbol locations are returned to their previous values and the normal symbol selection rules will apply.

In an alternative embodiment, the cloning process can occur after it has been decided whether to award a prize such that the cloned symbols only have an effect in a subsequent game round. Such an embodiment is suitable for an arrangement where the game round is part of a series of game rounds, such as is the case of the game round is one of a series of free games or free spins.

Any of the known rules for controlling the occurrence of feature in a game may be used to control when the cloning process may occur, for example, cloning may always occur as part of each game round, the cloning may only occur when certain types of bet are made, or cloning may only occur when a trigger event occurs, such as a particular symbol or combination of symbols, a turnover amount, or an external event. Similar events may control the extent to which there is cloning or they type of cloning, for example how many reels are cloned. Cloning may also only occur during certain parts of the game, for example during a series of free spins.

In one embodiment the clone subset is identical to the original subset, and the symbols of the original subset are duplicated side by side at half-width, fitting in the same display position. In another embodiment, the clone subset is laterally displaced from the original subset (e.g. on another reel) and symbols of the original subset replace symbols previously occupying corresponding display positions of the cloned subsets.

In some embodiments only the visible symbols of one reel are cloned—e.g. those which have been spun to a stop at the display positions used in evaluating a win based on win lines. In another embodiment all of the symbols of a reel are cloned. Intermediate embodiments where one or visible symbols of a reel but less than all the symbols are cloned are also possible.

In another embodiment, the original subset and each clone subset are mutually non-overlapping rectangular regions of the display positions.

In an embodiment, cloning is triggered by the appearance of a particular symbol combination in the display positions, by a random event, or by the player purchasing a cloning right or by another event known in the art.

The original subset may be determined by player choice, by a random event, or by the occurrence of a particular symbol or symbol combination. The clone subset may be determined in an analogous fashion. The player choice may includes the payment of different wagers to get eligibility for the symbol or symbol combination.

In embodiments which involve retaining the cloned symbols during one or more following cloned symbol game rounds ot is advantageous to restrict the symbol selection in the following cloned symbol game rounds so that the reel positions for reels containing the clone subset and the original subset are fixed relative to each other.

Further embodiments will be apparent from the following examples.

EXAMPLE 1

Now referring to FIG. 7, the display is divided into 5 reels 740*a* to 740*e* numbered 1 to 5 from left to right each displaying 3 symbols in a visible reel window, arranged into top line 750*a*, centre line 750*b* and bottom line 750*c*. In this case the system is arranged so that the clone feature can be accessed by player choice. A player has indicated via game play mechanism 56 the desire to enter into a "clone" feature. The reels spin and stop and the player sees the symbols shown in FIG. 7A. The player is then asked via the action of original subset controller 621 to select a particular original subset to clone, in this case only all display positions of any one reel are on offer. The player selects reel 2 as the original subset. The player is then asked via the action of clone subset controller 622 to select a particular clone subset to clone, in this case only all display positions of any one other reel are on offer. The player selects reel 1 as the clone subset. The cloned symbol controller 621 now copies the symbols in the original subset, which is laterally displaced from the clone subset, to the clone subset resulting in the display shown in FIG. 7B. The prize is now evaluated by outcome generator 630 and the player is paid for three "10"s on the centre line using the WILD symbols. Using the clone feature, the player has turned a non-winning game in FIG. 7A to a winning game.

EXAMPLE 2

Now referring to FIG. 8, a player has purchased the right to clone 2 reels in advance, on the future occurrence of a trigger event. The reels have spun, showing the arrangement of symbols in FIG. 8A. An offer to use the right to clone 2 reels in this game round has been generated by cloned symbol controller 620 as a result of the occurrence of particular symbol, namely a WILD symbol, on one of the reels, which automatically becomes the original subset. The player indicates via game play mechanism 56 the desire to accept the offer. The original subset is the reel with the WILD symbol, reel 2. The player is then asked via the action of clone subset controller 622 to select a particular clone subset to clone, in this case only all display positions of two other reels are on offer. The player selects reels 1 and 3 as the clone subset. The cloned symbol controller 621 now copies the symbols in the original subset, which is laterally displaced from the clone subset, to the clone subset resulting in the display shown in FIG. 8B. The prize is now evaluated by outcome generator 630 and the player is paid for three Kings on the top line, four Kings on the centre line using the three WILD symbols, and three 9s on the bottom line.

The game rules specify that the player may keep the cloned reels for a following cloned symbol game round so that the reel positions for reels containing the clone subset and the original subset are fixed relative to each other. In this case, even the non-visible symbols on the original reel are also copied to corresponding non-visible positions on the clone reels, so that the original and clone reels show the same symbols in each visible reel position in the following cloned symbol game round. The reels spin resulting in the arrangement shown in FIG. 8C, with all three reels identical. The prize is now evaluated by outcome generator 630 and the player is paid for three 9s on the top line, three 8s on the centre line, and four 7s on the bottom line.

EXAMPLE 3

Now referring to FIG. 9, a player has won from the action of the game rules the right to three successive games each with a separate cloning action using reel 3 as the original subset. The player may clone 3 reels in each game. The starting arrangement of symbols is shown in FIG. 9A. For the first game, the player is asked via the action of clone subset controller 622 to select a particular clone subset to clone, in this case up to three other entire reels. The player selects reels 1,2 and 4 as the clone subset. The cloned symbol controller 621 now copies the symbols in the original subset, reel 3, which is laterally displaced from the clone subset, to the clone subset resulting in the display shown in FIG. 9B. The prize is now evaluated by outcome generator 630 and the player is paid for four Jacks on the top line, four 10s on the centre line, and four SCATTER (SCATTER is a symbol which can be combined across lines, irrespective of its position, for a win).

The reels then spin in normal fashion and show the arrangement shown in FIG. 9C. For the second clone game, with the original subset fixed by the game rules at reel 3, the player selects again reels 1,2 and 4 as the clone subset. The cloned symbol controller 621 now copies the symbols in the original subset, reel 3, which is laterally displaced from the clone subset, to the clone subset resulting in the display shown in FIG. 9D. The prize is now evaluated by outcome generator 630 and the player is paid for four Aces on the top line, five 9s on the centre line, and five Kings on the bottom line.

The reels then again spin in normal fashion and show the arrangement shown in FIG. 9E. For the third clone game, with the original subset again fixed by the game rules at reel 3, the player selects again reels 1,2 and 4 as the clone subset. The cloned symbol controller 621 now copies the symbols in the original subset, reel 3, which is laterally displaced from the clone subset, to the clone subset resulting in the display shown in FIG. 9F. The prize is now evaluated by outcome generator 630 and the player is paid for four Queens on the top line, five Jacks on the centre line, and four SCATTERs.

In this example there are no following cloned symbol game rounds with the reels in fixed relationship.

EXAMPLE 4

Now referring to FIG. 10, a player has won from the action of the game rules at random the right to clone a 2 by 2 rectangular region to another non-overlapping region. The starting arrangement of the symbols is shown in FIG. 10A. The gaming system determines the original subset and highlights it as shown in FIG. 10B. The player is then asked via the action of clone subset controller 622 to select another non-overlapping 2 by 2 region as the clone subset. The player selects the region on reels 3 and 4 shown in FIG. 10C. The cloned symbol controller 621 now copies the symbols in the original subset, which is laterally displaced from the clone subset, to the clone subset resulting in the display shown in FIG. 10D. The prize is now evaluated by outcome generator 630 and the player is paid for four Aces on the top line using the WILD cards and three SCATTERs.

In this example there are no following cloned symbol game rounds with the reels in fixed relationship.

EXAMPLE 5

Now referring to FIG. 11, a player has purchased by choice the right to clone a reel. The starting arrangement of the symbols is shown in FIG. 11A. The player chooses the original subset as reel 1 and the gaming system highlights it as also shown in FIG. 11A. The player is then asked via the action of clone subset controller 622 to select this reel or another reel as the clone subset. The player selects reel 1, so that the original and clone subsets are identical. The cloned symbol controller 621 now copies the symbols in the original subset to the clone subset at the same display position resulting in the "split reel" display shown in FIG. 11B where two symbols are displayed within each symbol position. The prize is now evaluated by outcome generator 630 and the player is paid for four Kings on the top line and four Jacks on the centre line. The pays being paid, in this example, irrespective of the position of symbols on the line—i.e. the symbols do not have to be contiguous. In other embodiments, pays may be left to right, right to left or either left to right or right to left or in accordance with other evaluation techniques known in the art, such as those used in games where players select reels rather than pay lines.

The game rules in this example specify that the player may keep the cloned reels for a following cloned symbol game round so that the reel positions for reels containing the clone subset and the original subset are fixed relative to each other. Even the non-visible symbols on the original reel are also copied to corresponding non-visible positions on the clone reels, so that the original and clone reels show the same symbols in each visible reel position in the following cloned symbol game round—i.e. the whole reel is cloned. The reels spin resulting in the arrangement shown in FIG. 11C, with the split reels identical. The prize is now evaluated by outcome generator 630 and the player is paid for four Aces on the top line and four 7s on the bottom line.

Persons skilled in the art will appreciate that the method of the preferred embodiment could be embodied in program code. The program code could be supplied in a number of ways, for example on a computer readable medium, such as a disc or a memory (for example, that could replace part of memory 103) or as a data signal (for example, by downloading it from a server).

Persons skilled in the art will also appreciate that many variations may be made to the invention without departing from the scope of the invention. in particular, features of the above embodiments and examples may be employed to make further embodiments.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A gaming system comprising:

a display for symbols to be displayed in a set of display positions to a player;

a symbol selector for selecting in each game round a plurality of symbols for display to the player in a set of display positions;

a cloned symbol controller arranged to modify the displayed symbols by copying each symbol in an original subset of the display positions to at least one clone subset of the display positions which is identical to or laterally displaced from the original subset, in response to determining that a subset of the symbols should be cloned; and an outcome generator arranged to determine an outcome based on the modified symbols;

wherein the cloned symbol controller is arranged to retain the cloned symbols during one or more following cloned symbol game rounds;

wherein the game controller is arranged to restrict the symbol selection in the following cloned symbol game rounds so that the reel positions for reels containing the clone subset and the original subset are fixed relative to each other; and wherein the original subset is all the visible positions of an original reel and the cloned subsets are all the visible positions of clone reels, and non-visible symbols on the original reel are also copied to corresponding non-visible positions on the clone reels, so that the original and clone reels show the same symbols in each visible reel position in the following cloned symbol game rounds.

2. A gaming system as claimed in claim 1, wherein subsets of the display positions correspond to respective ones of a plurality of reels set side by side, each subset comprising a plurality of visible reel positions on spinning reels.

3. A gaming system as claimed in claim 2 comprising a game play mechanism operable by the player for game play.

4. A gaming system as claimed in claim 2 comprising a memory storing program code and a processor arranged to execute the program code to implement the game controller.

5. A gaming system as claimed in claim 1 wherein the clone subset is identical to the original subset, and the symbols of the original subset are duplicated side by side at half-width, fitting in the same display position.

6. A gaming system as claimed in claim 5 wherein the original subset is all the visible symbols of one reel.

7. A gaming system as claimed in claim 1 wherein the clone subset is laterally displaced from the original subset and symbols of the original subset replace symbols previously occupying corresponding display positions of the cloned subsets.

8. A gaming system as claimed in claim 7 wherein the original subset is all the symbols at least at the display positions of an original reel and the clone subsets are displaced horizontally from the original subset occupying clone reels, whereby the visible symbols of the original reel are copied to the clone reels.

9. A gaming system as claimed in claim 1 wherein the original subset and each clone subset are mutually non-overlapping rectangular regions.

10. A gaming system as claimed in claim 9 wherein at least one of the clone subsets is not fully within the display positions of the reel whereby other symbols on at least one reel are changed.

11. A gaming system as claimed in claim 1 wherein the game controller is arranged to determine that a subset of the symbols should be cloned in response to at least one of the appearance of a particular symbol combination in the display positions, a random event, or the player purchasing a cloning right.

12. A gaming system as claimed in claim 1 wherein the game controller is arranged to determine the original subset based on at least one of a player choice, a random event, or the occurrence of a particular symbol or symbol combination.

13. A gaming system as claimed in claim 12 wherein the player choice includes the payment of different wagers depending on the symbol or symbol combination.

14. A gaming system as claimed in claim 1 wherein the game controller is arranged to determine the at least one clone subset based on at least one of a player choice, a random event, or the occurrence of a particular symbol or symbol combination.

15. A gaming system as claimed in claim 14 wherein the player choice includes the payment of different wagers depending on the symbol or symbol combination.

16. A game controller for a gaming system, the game controller comprising:

a symbol selector for selecting in each game round a plurality of symbols for display to the player in a set of display positions on a display in data communication with the game controller;

a cloned symbol round controller arranged to modify the displayed symbols by copying each symbol in an original subset of the display positions to at least one clone subset of the display positions which is identical to or laterally displaced from the original subset, in response to determining that a subset of the symbols should be cloned; and an outcome generator arranged to determine an outcome based on the modified symbols wherein the cloned symbol controller is arranged to retain the cloned symbols during one or more following cloned symbol game rounds;

wherein the game controller is arranged to restrict the symbol selection in the following cloned symbol game rounds so that the reel positions for reels containing the clone subset and the original subset are fixed relative to each other; and wherein the original subset is all the visible positions of an original reel and the cloned subsets are all the visible positions of clone reels, and non-visible symbols on the original reel are also copied to corresponding non-visible positions on the clone reels, so that the original and clone reels show the same symbols in each visible reel position in the following cloned symbol game rounds.

17. A game controller as claimed in claim 16, wherein subsets of the display positions correspond to respective ones of a plurality of reels set side by side, each subset comprising a plurality of visible reel positions on spinning reels.

18. A game controller as claimed in claim 16, wherein the clone subset is identical to the original subset, and the symbols of the original subset are duplicated side by side at half-width, fitting in the same display position.

19. A game controller as claimed in claim 18 wherein the original subset is all the visible symbols of one reel.

20. A game controller as claimed in claim 19 wherein the original subset is all the symbols at least at the display positions of an original reel and the clone subsets are displaced horizontally from the original subset occupying clone reels, whereby the visible symbols of the original reel are copied to the clone reels.

21. A game controller as claimed in claim 16, wherein the clone subset is laterally displaced from the original subset and symbols of the original subset replace symbols previously occupying corresponding display positions of the cloned subsets.

22. A game controller as claimed in claim 16, wherein the original subset and each clone subset are mutually non-overlapping rectangular regions.

23. A game controller as claimed in claim 22 wherein at least one of the clone subsets is not fully within the display positions of the reel whereby other symbols on at least one reel are changed.

24. A game controller as claimed in claim 16 arranged to determine that a subset of the symbols should be cloned in response to at least one of the appearance of a particular symbol combination in the display positions, a random event, or the player purchasing a cloning right.

25. A game controller as claimed in 16 arranged to determine the original subset based on at least one of a player choice, a random event, or the occurrence of a particular symbol or symbol combination.

26. A game controller as claimed in claim 25 wherein the player choice includes the payment of different wagers depending on the symbol or symbol combination.

27. A game controller as claimed in claim 16, arranged to determine the at least one clone subset based on at least one of a player choice, a random event, or the occurrence of a particular symbol or symbol combination.

28. A game controller as claimed in claim 27 wherein the player choice includes the payment of different wagers depending on the symbol or symbol combination.

29. A game controller as claimed in claim 16 implemented by a processor executing program code stored in a memory.

* * * * *